J. M. BRICK.
Corn-Stalk Knives.

No. 138,069. Patented April 22, 1873.

UNITED STATES PATENT OFFICE.

JOSEPH M. BRICK, OF MARLTON, NEW JERSEY.

IMPROVEMENT IN CORN-STALK KNIVES.

Specification forming part of Letters Patent No. 138,069, dated April 22, 1873; application filed March 1, 1873.

*To all whom it may concern:*

Be it known that I, JOSEPH M. BRICK, of Marlton, in the county of Burlington and State of New Jersey, have invented a new and Improved Corn-Stalk Knife; and I do hereby declare that the following is a full, clear, and exact description thereof, reference being had to the accompanying drawing making part of this specification, in which—

Figure 1:
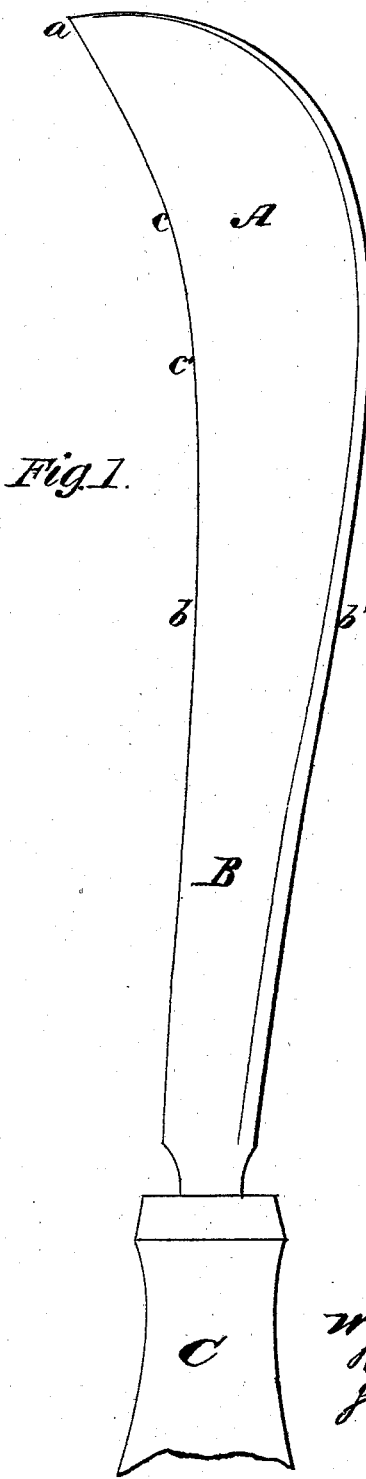
Figure 2:
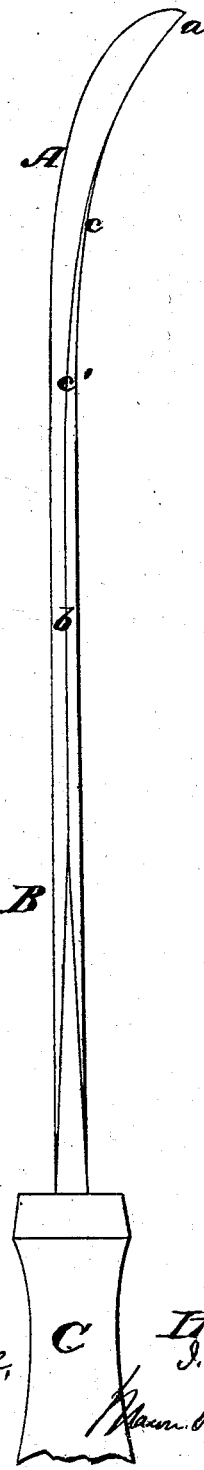

Figure 1 is a view of the flat side of the knife. Fig. 2 is an edge view of the same.

Similar letters of reference indicate corresponding parts in the several figures.

This invention relates to an improvement on knives which are especially designed for use in the operation of cutting corn and cane stalks. My object is to shape such a knife that it will give a draw-cut at every blow, and at the same time cut with an upward oblique scooping action without forcing the stalks away from it, as will be hereinafter explained.

The following description of my invention will enable others skilled in the art to understand it.

In practice, the blade A B will be from twenty-one to twenty-three inches from the handle C to the point, and will taper in width from A to the point and handle, so that at A the blade will be widest. The cutting-edge of the blade, which will extend from B to the point $a$, presents a concave curve, the greatest degree of concavity being from $c'$ to $a$, and the least from $c'$ to $b$, from which point the edge may be straight to the handle C. The back edge of the blade, which may also be sharpened, is convex from $b'$ to $a$, and straight from $b'$ to the handle, the greatest swell being at A, which leaves the blade widest at this point, as above stated. Now, for the purpose of giving the scooping draw-cut when the knife strikes the stalks, I bend the cutting end of the knife laterally, as shown in Fig. 2, so that it presents a slight twist, and leaves this part of the blade concave on one side and convex on the opposite side.

By thus curving the cutting-edge in two directions, its action upon the stalks will be upward and at the same time sliding; or, in other words, an oblique draw-cut will be produced, whatever portion of the concave edge from $a$ to $b$ strikes the stalks. For example, if any portion of the cutting-edge from $a$ to $c'$ strikes a stalk, the draw-cut will be backward.

The hooking curve given to the cutting-edge will also draw the stalks up to the cut, whereas, if such edge was convex—that is to say, if its curve was reversed—the tendency of the cut would be to throw the stalks from the point of the knife instead of gathering them in, as stated.

Having described my invention, what I claim as new, and desire to secure by Letters Patent, is—

A corn-stalk knife which has its blade near its point bent upward from its horizontal plane, and also outward from its vertical plane, as herein described and shown.

JOSEPH M. BRICK.

Witnesses:
EDM. F. BROWN,
J. N. CAMPBELL.